(12) United States Patent
Clegg et al.

(10) Patent No.: US 10,475,126 B1
(45) Date of Patent: Nov. 12, 2019

(54) INSURANCE QUOTE SYSTEM

(71) Applicant: LITTLE BEAR ENTERPRISES, LLC, Gilbert, AZ (US)

(72) Inventors: Timothy L Clegg, Gilbert, AZ (US); Bart Jarman, Gilbert, AZ (US); John Lopez, Tucson, AZ (US)

(73) Assignee: Little Bear Enterprises, LLC, Gilbert, AZ (US)

( * ) Notice: Subject to any disclaimer, the term of this patent is extended or adjusted under 35 U.S.C. 154(b) by 169 days.

(21) Appl. No.: 14/107,994

(22) Filed: Dec. 16, 2013

(51) Int. Cl.
*G06Q 40/08* (2012.01)

(52) U.S. Cl.
CPC ................... *G06Q 40/08* (2013.01)

(58) Field of Classification Search
USPC .......................................... 705/4, 2; 715/700
See application file for complete search history.

(56) References Cited

U.S. PATENT DOCUMENTS

| | | | |
|---|---|---|---|
| 7,010,503 B1 * | 3/2006 | Oliver et al. ...................... | 705/4 |
| 7,017,111 B1 * | 3/2006 | Guyan et al. ................... | 715/230 |
| 7,363,271 B2 * | 4/2008 | Morimoto ....................... | 705/37 |
| 7,627,490 B2 | 12/2009 | Kendal et al. | |
| 7,634,420 B2 | 12/2009 | Kendall et al. | |
| 7,840,473 B2 | 11/2010 | Kraehenbuehl et al. | |
| 8,335,701 B1 | 12/2012 | Syed et al. | |
| 2001/0037281 A1 | 11/2001 | French et al. | |
| 2001/0049611 A1 | 12/2001 | Peach | |
| 2002/0069090 A1 | 6/2002 | De Grosz et al. | |
| 2002/0091550 A1 | 8/2002 | Hele et al. | |
| 2002/0111835 A1 | 8/2002 | Hele et al. | |
| 2002/0116231 A1 | 8/2002 | Hele et al. | |
| 2002/0194033 A1 | 12/2002 | Huff | |
| 2003/0144887 A1 | 7/2003 | Debber | |
| 2003/0204421 A1 | 10/2003 | Houle et al. | |
| 2004/0078243 A1 | 4/2004 | Fisher | |

(Continued)

FOREIGN PATENT DOCUMENTS

| | | |
|---|---|---|
| IN | 1110/MUM/2009 | 11/2010 |
| WO | WO0101299 A1 | 1/2001 |

OTHER PUBLICATIONS

Gregory V. Serio, External Forces Shaping the Future of the Insurance Industry, The Geneva Papers, 2006, 31, (31-37).

*Primary Examiner* — Kelly S Campen
(74) *Attorney, Agent, or Firm* — Adam R. Stephenson, Ltd.

(57) ABSTRACT

An insurance quote system includes a database server, a web server and an insurance broker operatively coupled together. A plurality of insurance carrier computers are coupled with the web server through a telecommunication channel. A first computer interface of the insurance broker computer includes a data entry window having a plurality of data entry fields configured to receive data inputs including an insurance carrier identifier, an insurance form identifier, an insurance endorsement identifier, an insurance coverage issue, and a status score for the insurance coverage issue. A second computer interface includes a quote viewing window, and a third computer interface includes a form selection window configured to allow the user to select a plurality of insurance form identifiers and insurance endorsement identifiers referenced in a plurality of quotes. A report generation button on the third computer interface may be selected to generate a quote report based upon the referenced identifiers.

3 Claims, 9 Drawing Sheets

(56) References Cited

U.S. PATENT DOCUMENTS

2005/0055299 A1 3/2005 Chambers et al.
2006/0136274 A1 6/2006 Olivier et al.
2006/0206362 A1 9/2006 Rudy et al.
2012/0284058 A1 11/2012 Varanasi et al.
2014/0297335 A1* 10/2014 Wargin et al. .................... 705/4

* cited by examiner

ADD/EDIT

| CARRIER | FORM / ENDORSEMENT | COVERAGE ISSUE | STATUS | SCORE | FORM TYPE | | |
|---|---|---|---|---|---|---|---|
| XCEL Ins Group | X22284 | Transit Pollution | Covered | 5 | Base | ✎ | X |
| XCEL Ins Group | X24432 | EIFS | Not Covered | 0 | Endors. | ✎ | X |
| XCEL Ins Group | X25505 | Mold | Covered | 4 | Endors. | ✎ | X |
| Ace Insurance | CB 00 00 01 | Asbestos | Yes | 4 | Base | ✎ | X |
| Ace Insurance | CB 00 00 01 | Mold | False | 0 | Base | ✎ | X |
| Ace Insurance | CB 00 00 01 | Transit Pollution | No | 0 | Base | ✎ | X |
| Ace Insurance | CB 00 00 01 | Nonowned Dispos. | Excluded | 0 | Base | ✎ | X |
| Ace Insurance | CB 00 00 01 | Prof. Liability | Covered | 1 | Base | ✎ | X |
| Ace Insurance | CB 00 00 01 | EIFS | Silent | 0 | Base | ✎ | X |
| Ace Insurance | CB 00 00 01 | Sep. Def. Lims. | Covered | 5 | Base | ✎ | X |
| Ace Insurance | CB 00 00 01 | Silica | Excluded | 0 | Base | ✎ | X |
| Ace Insurance | CB 00 00 01 | Fines & Penalties | False | 0 | Base | ✎ | X |
| Ace Insurance | CB 00 00 01 | Nat. Resource Pol. | True | 3 | Base | ✎ | X |
| Ace Insurance | CB 00 00 02 | Mold | Covered | 4 | Endors. | ✎ | X |
| Ace Insurance | CB 00 00 02 | EIFS | Covered | 2 | Endors. | ✎ | X |
| Ace Insurance | AZ 00 05 67 | Silica | True / False / Covered / Not Covered / Yes / No / Excluded / Silent | 2 | Endors. | ✎ | X |

ADD NEW

FIG. 2

A TO Z AUTO INSURANCE COMPANY
SCOTTSDALE, ARIZONA 85283
BUSINESS AUTOMOBILE INSURANCE QUOTE

QUOTE NUMBER
22511A3558A4E5
VEHICLE DESCRIPTION: 1995 TOYOTA COROLLA LE
TERRITORY: 45
COVERAGES – LIMITS, PREMIUMS AND DEDUCTIBLES

| COVERAGE | INSURANCE LIMITS | PREMIUM |
|---|---|---|
| LIABILITY | | $666.00 |
|   BODILY INJURY – EACH PERSON | $50,000 | |
|   BODILY INJURY – EACH ACCIDENT | $100,000 | |
|   PROPERTY DAMAGE PER ACCIDENT | $50,000 | |
| | | |
| MEDICAL PAYMENTS – EACH PERSON | REJECTED | |
| | | |
| UNINSURED MOTORIST | | $56.00 |
|   BODILY INJURY – EACH PERSON | $50,000 | |
|   BODILY INJURY – EACH ACCIDENT | $100,000 | |
| | | |
| UNDERINSURED MOTORIST | | $27.00 |
|   BODILY INJURY – EACH PERSON | $50,000 | |
|   BODILY INJURY – EACH ACCIDENT | $100,000 | |
| | | |
| PHYSICAL DAMAGE (NOT COLLISION) | REJECTED | |
| | | |
| COLLISION | REJECTED | |
| | TOTAL PREMIUM | $749.00 |

FORMS AND ENDORSEMENTS:
AG 452 221 00    GT 884 522 12    HY 884 445 32
AG 452 221 47    GT 447 411 14    HY 441 223 51
AG 452 662 01    GX 114 221 47    HZ 112 144 12
AG 221 554 36    HA 122 244 15    JK 445 553 47
AG 899 252 14    HA 447 855 65    JK 889 877 45
GT 849 124 14    HA 111 124 53
GT 622 144 32    HY 884 354 85

-------------------------------------------------------------

FORM AG 452 221 00
SECTION 1 – COVERED AUTOS
THE SYMBOLS LISTED BELOW DESCRIBE THE AUTOS THAT MAY BE COVERED.
A. COVERED AUTO SYMBOLS
1 – ANY AUTO

FIG. 3

SELECT FORMS AND ENDORSEMENTS

AZ 555 153

XCEL Insurance Group — 28

X22284
X24432 ✓
X25505

Ace Insurance — 28

CB 00 00 01 ✓
CB 00 00 02 ✓
CB 00 00 05
CA 05 05 04 ✓
CA 05 05 06 ✓
AZ 88 55 45
AZ 89 88 55 ✓
IL 00 00 03 ✓
IL 00 01 05 ✓
IL 00 04 05 ✓
IL 00 04 15

GENERATE REPORT

FIG. 4

MOLD

The definition of mold is relevant and should be as broad as possible to avoid interpretation issues later. Mold, mildew, fungus and the related spores, byproducts and mycotoxins are common elements of the definition of mold.

| A to Z Ins. | Covered | 3 |
|---|---|---|
| XCEL Ins. | Covered | 5 |
| Ace | Not covered | 0 |

TRANSIT POLLUTION

In addition to the potential liability described in the prior section, a property owner can be liable for transported cargo if that cargo escapes on the roadway and causes a pollution condition. Coverage was requested even though it is not a significant exposure for BMR.

| A to Z Ins. | 4 |
|---|---|
| XCEL Ins. | 2 |
| Ace | 4 |

NON-OWNED DISPOSAL SITE

A property owner could face environmental liability as a result of contamination on their own location, contamination on an adjacent property that migrated from their own location, or from contamination at a non-owned location (such as a landfill) if the contaminant originated at their location. Non-owned coverage is essentially coverage for any BMR waste that may be sent to a landfill that leaks through the liner and becomes a mandated clean-up. Government officials will review the landfill manifest to find potentially responsible parties in the event of a contamination problem. Your most likely exposure would come from tenants disposing of potentially hazardous materials.

| A to Z Ins. | 2 |
|---|---|
| XCEL Ins. | 3 |
| Ace | 5 |

TRANSIT POLLUTION

A pollution policy covers third-party property damage resulting from a covered pollution incident. The pollution conditions could migrate from the covered location and end up in a river, lake, grassy meadow, etc. and kill plants, fish or other animals. It has historically been a gray area whether loss of plant or animal life fell under property damage. Pollution forms can be amended to clarify coverage for such issues by providing Natural Resource Damage coverage.

| A to Z Ins. | 4 |
|---|---|
| XCEL Ins. | 2 |
| Ace | 4 |

FIG. 5

SUMMARY

To procure the best terms at the best possible price, we first conducted a review of all carriers writing environmental insurance. Carriers were then given the opportunity to review basic information about your account. Based on initial review the following occurred:

| CARRIERS WHO REVIEWED BASIC INFORMATION | CARRIERS WHO REVIEWED ALL INFORMATION | CARRIERS WHO OFFERED A QUOTE | CARRIERS WHO INDICATED A PREVIOUS QUOTE |
|---|---|---|---|
| 23 | 5 | 2 | 0 |

CARRIER SUMMARY
The following carriers have offered quotes

| CARRIER | AM BEST RATING |
|---|---|
| XCEL Insurance | 1 |
| Ace Insurance | 3 |

Summary Comparison of Financial Terms Offered

PROPOSED POLICY TERM
The typical CPL policy term is one year. However, some carriers may have offered a longer policy term for your account. A couple of key things to note if this is the case:
- Limits do not reset during the policy term. This means that a significant loss in the early part of the policy could mean depleted limits for the rest of the period.
- Pricing typically reflects this, and there can be some substantial savings on multi-year policies.

| CARRIER | PROPOSED EFF. DATE | PROPOSED EXP. DATE | POLICY TERM |
|---|---|---|---|
| XCEL Insurance | 5/1/2014 | 5/1/2015 | 1 YR |
| Ace Insurance | 6/15/2014 | 6/15/2015 | 1 YR |

LIMITS & DEDUCTIBLE
After your contracting revenues, limits represent the second biggest factor in determining your premium. Carriers may have offered various limit options as outlined below. Regarding deductibles or an SIR (self-insured retention), you should be aware that unlike other types of insurance that you may be familiar with, there is often little premium savings with higher deductibles. The table below indicates the various limits and deductibles being offered at this time, along with the related premiums.

| OPTION | CARRIER | PER OCC. LIMIT | AGG. LIMIT | DEDUCTIBLE / SIR | PREMIUM |
|---|---|---|---|---|---|
| 1 | XCEL | $2.5M | $30M | $20k | $1,200 |
| 2 | Ace | $2.0M | $25M | $15k | $1,050 |

INSURANCE QUOTE SYSTEM

BACKGROUND

1. Technical Field

Aspects of this document relate generally to systems and methods related to business processes. Particular implementations involve systems and methods design to handle insurance quotation transactions between consumers, brokers, and carriers.

2. Background Art

Insurance policies are contractual documents drafted by attorneys for insurance companies that state the various terms and conditions under which the insurance company will cover various types of losses that the policy holder is insured for. Insurance brokers can be agents for one insurance company or many different companies and work with prospective clients to help the prospective client purchase insurance. During the process, one or more insurance quotes are generally provided to potential covered individuals or entities, from one or more potential carriers or providers, before the potential covered individual or entity enters into a contract for the provision of insurance.

SUMMARY

Implementations of an insurance quote system may include: a database server, a web server and an insurance broker computer operatively coupled together, the database server coupled to a database; a plurality of insurance carrier computers coupled with the web server through a telecommunication channel; a first computer interface displayed on a computer display coupled with the insurance broker computer, the first computer interface including a data entry window having a plurality of data entry fields configured to receive data inputs, including: a first data entry field configured to receive an insurance carrier identifier; a second data entry field configured to receive an identifier for one of an insurance form (insurance form identifier) and an insurance endorsement (insurance endorsement identifier); a third data entry field configured to receive an insurance coverage issue; a fourth data entry field configured to receive a status for the insurance coverage issue; and a fifth data entry field configured to receive a status score for the insurance coverage issue; wherein the insurance broker computer is configured to, in response to an input from a user, request the database server to write the data inputs to the database, and wherein the database server is configured to write the data inputs to the database in response to the request; a second computer interface displayed on the computer display including a quote viewing window configured to allow the user to view a plurality of quotes received at the web server through the telecommunication channel from the plurality of insurance carrier computers; and a third computer interface displayed on the computer display including a form selection window configured to allow the user to select a plurality of insurance form identifiers and insurance endorsement identifiers indicating a plurality of insurance forms and a plurality of insurance endorsements referenced in the plurality of quotes; wherein the third computer interface includes a report generation button configured to generate, upon selection by the user, a quote report, wherein the insurance broker computer is configured to, in response to the report generation button being selected, retrieve from the database, using the database server, a plurality of insurance coverage issues referenced in the plurality of quotes and the status score for each referenced insurance coverage issue and include, in the quote report, in a table for each referenced insurance coverage issue, the status score for that referenced insurance coverage issue.

Implementations of an insurance quote system may include one, all, or any of the following:

The first through fifth data entry fields may be further configured to edit an already received data input.

One or more of the first through fifth data entry fields may include a dropdown list.

Implementations of a method of providing an insurance quote report (quote report) may include: receiving at a database server, from an insurance broker computer coupled to the database server: a plurality of insurance coverage issues; identifiers for a plurality of insurance forms (insurance form identifiers), wherein each insurance form references at least one of the insurance coverage issues; identifiers for a plurality of insurance endorsements (insurance endorsement identifiers), wherein each insurance endorsement references at least one of the insurance coverage issues; and a plurality of statuses, wherein each status represents a way in which one of the insurance coverage issues is addressed in one or more of the insurance forms and the insurance endorsements, and wherein each status includes one of a numerical value from zero to five, "yes," "no," "covered," "not covered," "excluded," "true," "false," and "silent"; storing, in a database coupled to the database server, using the database server, the plurality of insurance coverage issues, the insurance form identifiers, the insurance endorsement identifiers, and the plurality of statuses; receiving, at a web server coupled to the database server, through a telecommunication channel, from an insurance carrier computer, a quote, wherein the quote includes one or more of the insurance forms and one or more of the insurance endorsements; retrieving, using the database server, the status for each insurance coverage issue that is referenced in one or more of the insurance forms and the insurance endorsements included in the quote (referenced insurance coverage issues); and generating, using the insurance broker computer, the quote report, the quote report including each referenced insurance coverage issue and, in a table for each referenced insurance coverage issue, the status for that referenced insurance coverage issue.

Implementations of a method of providing an insurance quote report may include one, all, or any of the following:

Receiving at the database server, from the insurance broker computer, a status score.

The quote report may further include an overall score for the quote.

The overall score may include a numerical value from zero to five.

Receiving, at the web server, through the telecommunication channel, from the insurance carrier computer, one of an updated insurance form and an updated insurance endorsement.

Receiving at the database server, from the insurance broker computer, an updated status.

Each referenced insurance coverage issue included in the quote report, and the status for that referenced insurance coverage issue, may be retrieved from the database.

Implementations of a method of providing an insurance quote report (quote report) may include: receiving at a database server, from an insurance broker computer coupled to the database server: a plurality of insurance coverage issues; identifiers for a plurality of insurance forms (insurance form identifiers), wherein each insurance form references at least one of the insurance coverage issues; identifiers for a plurality of insurance endorsements (insurance endorsement identifiers), wherein each insurance endorsement references at least one of the insurance coverage issues; and a plurality of status scores, each status score associated with one of the insurance coverage issues that is referenced in one or more of the insurance forms and the insurance endorsements; storing, in a database coupled to the database server, using the database server, the plurality of insurance coverage issues, the insurance form identifiers, the insurance endorsement identifiers, and the plurality of status scores; receiving, on a web server coupled to the database server, from the insurance broker computer, an insurance application for a specific insurance product; sending the insurance application, using the web server, through a telecommunication channel, to a plurality of insurance carrier computers; receiving, at the web server, through the telecommunication channel, from one or more of the insurance carrier computers, one or more quotes for the specific insurance product, wherein each quote includes one or more of the insurance forms and one or more of the insurance endorsements; receiving, at the insurance broker computer, for each quote, a selection of the identifier for each insurance form and the identifier for each insurance endorsement that is included in the quote (selected identifiers); generating, using the database server, and using the selected identifiers, for each quote, a final status score for each insurance coverage issue referenced in the quote; and generating, using the insurance broker computer, the quote report, the quote report including a table for each insurance coverage issue associated, through the database, with one of the selected identifiers and, in each table, the final status score for each quote.

Implementations of a method of providing an insurance quote report may include one, all, or any of the following:

The element of generating, for each quote, the final status score for each insurance coverage issue referenced in the quote may include calculating the final status score using each status score that is associated, through the database, with the insurance coverage issue and that is associated, through the database, with at least one of the selected identifiers for the quote.

Calculating the final status score may include one of adding, subtracting, replacing, deprecating, and enhancing a status score for the insurance coverage issue that is associated, through the database, with one of the selected insurance form identifiers, in view of a status score for the insurance coverage issue that is associated, through the database, with one of the selected insurance endorsement identifiers.

Receiving, at the web server, through the telecommunication channel, from one or more of the insurance carrier computers, a request for additional information regarding an applicant.

Sending, from the web server, through the telecommunication channel to one or more of the insurance carrier computers, additional information regarding the applicant.

Receiving, at the web server, through the telecommunication channel, from one or more of the insurance carrier computers, an indication of interest.

Receiving, at the web server, from one or more of the insurance carrier computers, a request to view the insurance application.

The quote report may further include an overall score for each quote.

Receiving, at the web server, through the telecommunication channel, from one of the insurance carrier computers, one of an updated insurance form and an updated insurance endorsement.

Receiving at the database server, from the insurance broker computer, an updated status.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2 is a view of an implementation of a data entry window of an insurance quote system;

FIG. 3 is a view of an implementation of a quote viewing window of an insurance quote system;

FIG. 4 is a view of an implementation of a form selection window of an insurance quote system;

FIG. 5 is a view of a page of an implementation of a quote report generated by an insurance quote system;

FIG. 6 is a view of another page of an implementation of a quote report generated by an insurance quote system;

DESCRIPTION

Figure 1:
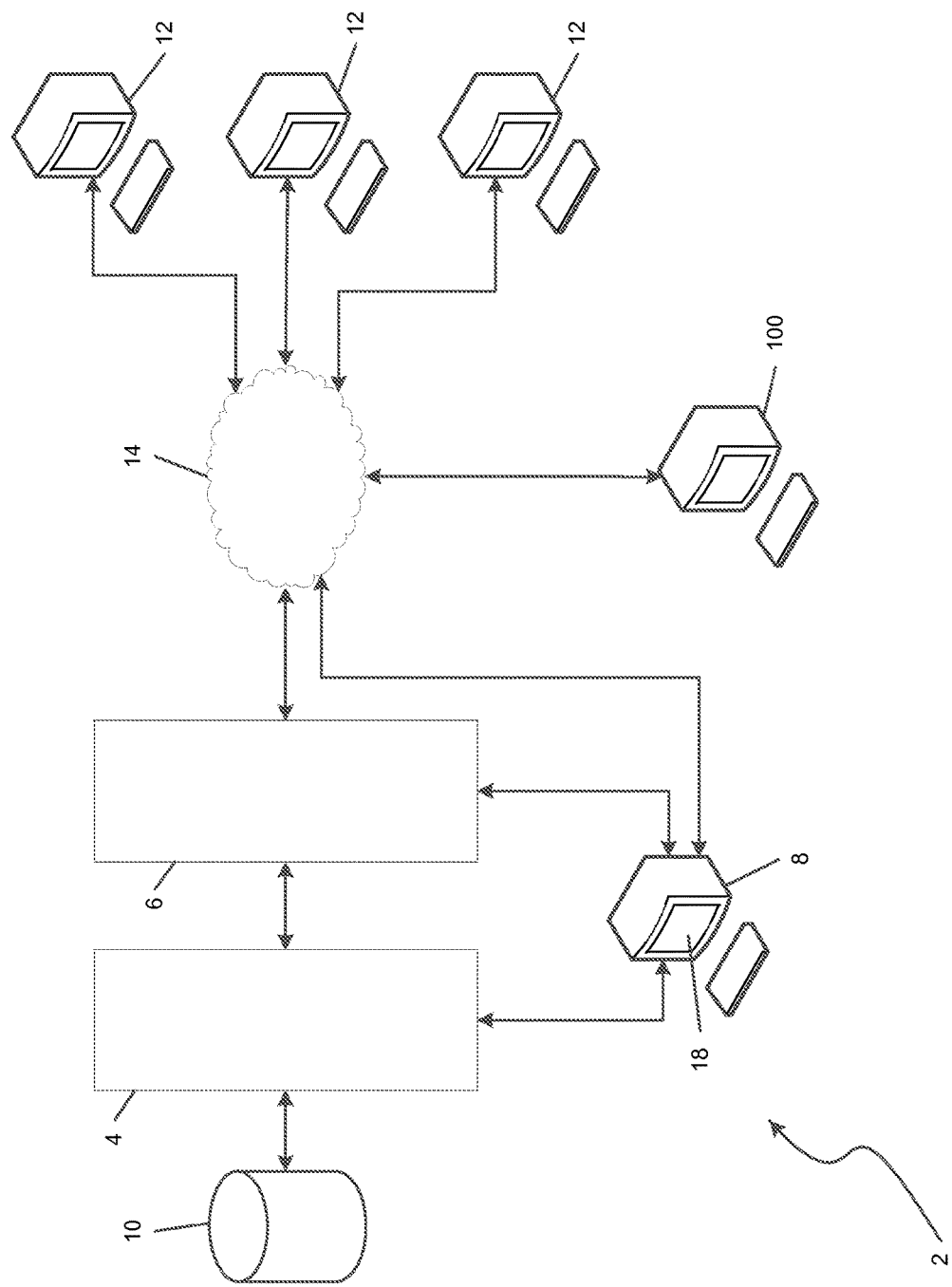
FIG. 1 is a block diagram of an implementation of an insurance quote system.

This disclosure, its aspects and implementations, are not limited to the specific components, assembly procedures or method elements disclosed herein. Many additional components, assembly procedures and/or method elements known in the art consistent with the intended insurance quote system and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such insurance quote systems and related methods, and implementing components and methods, consistent with the intended operation and methods.

As used herein, the following terms have the following meanings:

"Insurance broker," as used herein, means a person or entity that acts as an intermediary, for a commission, between an insurance carrier and an insured (or potential insured), or between an insurance carrier and an insurance agent, for the purchase by an insured (or a potential insured) of a specific insurance product.

"Insurance broker computer," as used herein, means a computer used by an insurance broker.

"Insurance carrier" and "carrier," as used herein, means a person or entity that contracts with an insured to indemnify the insured in the event of a loss or damage.

"Insurance carrier computer," as used herein, means a computer used by an insurance carrier.

"Insurance coverage issue," as used herein, means an item that is addressed in an insurance form or in an insurance endorsement to identify whether and how the item is dealt with in an insurance policy for a specific insurance product. By non-limiting example, an insurance policy for environmental liability insurance could include, among others, the following insurance coverage issues: asbestos; mold; transit pollution; non-owned disposal site; professional liability; Exterior Insulation Finishing System (EIFS); separate defense limits; definition of covered operations; silica; fines & penalties; natural resource damage; emergency response costs; blanket additional insured; blanket waiver of subrogation; blanket additional insured primary and non-contributory; product liability; silt and sedimentation; and the like. Also by non-limiting example, an insurance policy for business automobile insurance could include, among others, the following insurance coverage issues: liability; liability for bodily injury; medical payments; uninsured motorist bodily injury; underinsured motorist bodily injury; physical damage other than collision; collision; out-of state coverage; expected or intended injury; contractual damage; worker's compensation; employee indemnification; employer's liability; movement of property by mechanical device; pollution; war; racing; towing; glass breakage (hitting a bird or animal/ falling objects or missiles); transportation expenses; loss of use expenses; nuclear hazard; deductible; bankruptcy; concealment, misrepresentation or fraud; liberalization; policy period; coverage territory; arbitration; exclusions; terrorism; silica or silica-related dust; autos rented by employees; towing & transportation expenses; accidental airbag inflation; audio, visual and data electronic equipment; replacement cost; glass repair; mental anguish; cancellation; changes; examination of books and records; inspections and surveys; premiums; transfer of rights; nuclear energy liability; punitive damages; and the like. The foregoing are only given as examples of the breadth of items that may constitute an "insurance coverage issue" and be discussed in an insurance policy.

"Insurance endorsement," as used herein, means a document (digital or hard-copy) provided by an insurance carrier that modifies how one or more coverage issues are dealt with in an insurance form for a specific insurance product.

"Insurance form," as used herein, means a document (digital or hard-copy) provided by an insurance carrier that addresses how one or more coverage issues are dealt with for a specific insurance product.

"Specific insurance product," as used herein, means an insurance policy for a specific type or class of risk of damage or loss. By non-limiting example, some examples of specific insurance products are: accident insurance; all-risk insurance; auto insurance; aviation insurance; bloodstock insurance; boiler insurance; builder's risk insurance; burial insurance; business interruption insurance; casualty insurance; collateral protection insurance; credit insurance; crime insurance; crop insurance; defense base act insurance; dental insurance; directors and officers liability insurance; disability insurance; disability overhead insurance; divorce insurance; earthquake insurance; environmental liability insurance; errors and omissions insurance; expatriate insurance; fidelity bond; fire insurance; flood insurance; gap insurance; health insurance; home insurance; inland marine insurance; interest rate insurance; kidnap and ransom insurance; landlord insurance; legal expenses insurance; liability insurance; life insurance; livestock insurance; long-term disability insurance; media liability insurance; medical malpractice insurance; mortgage insurance; nuclear incident insurance; payment protection insurance; pet insurance; political risk insurance; pollution insurance; prize indemnity insurance; professional indemnity insurance; professional liability insurance; property insurance; public liability insurance; renter's insurance; sickness insurance; surety bond; terrorism insurance; theft insurance; title insurance; total permanent disability insurance; trade credit insurance; travel insurance; tuition insurance; unemployment insurance; weather damage insurance; worker's compensation insurance; vehicle insurance; and the like.

Referring to FIG. 1, in implementations an insurance quote system 2 includes an insurance broker computer 8, a web server 6 and database server 4 operatively coupled together. The database server 4 is coupled to a database 10. The web server 6 and insurance broker computer 8 are coupled, through a telecommunication channel 14, to a plurality of insurance carrier computers 12. In implementations an insurance agent computer 100 is coupled, through the telecommunication channel 14, to one or more, or all, of the insurance broker computer 8, the web server 6 and the plurality of insurance carrier computers 12. In various implementations, the insurance broker computer 8 could be coupled to the web server 6 and database server 4 only through the telecommunication channel 14. Some of the elements, components and sub-components and the like of the insurance quote system 2 may be included in a single computer or may be carried out through various hardware and software components using a plurality of computers. The servers may be virtualized or may actually be included in separate hardware components, and the like. Furthermore, in implementations one or more or all of the servers and other implementing components could be carried out using a cloud model such as, by non-limiting example, by utilizing the product marketed under the trade name WINDOWS AZURE by Microsoft Corporation of Redmond, Wash., or the like.

The insurance broker computer 8 includes a computer display 18. In implementations the computer display 18 includes a first computer interface 16 which includes (referring to FIG. 2) a data entry window 20. The data entry window 20 in various implementations includes a plurality of data entry fields 22 that are configured to receive a data input 24. In implementations a first data entry field 26 is configured to receive an insurance carrier identifier 28, a second data entry field 30 is configured to receive an identifier for an insurance form (insurance form identifier) 32 and/or an identifier for an insurance endorsement (insurance endorsement identifier) 34, a third data entry field 38 is configured to receive an insurance coverage issue (coverage issue) 40, a fourth data entry field 42 is configured to receive a status 44, a fifth data entry field 46 is configured to receive a status score 48, and a sixth data entry field 114 is configured to receive a form type indicator 116. The form type indicator 116 is configured to indicate whether the data input 24 in the second data entry field 30 for that row is an insurance form identifier 32 or an insurance endorsement identifier 34 (for example, in the implementation shown the form type indicator 116 "Base" is input when the data input 24 in the second data entry field 30 is an insurance form identifier 32 (i.e., indicating an insurance form or, in other words, a "base" form) and "Endors." is input when the data input 24 in the second data entry field 30 for that row is an insurance endorsement identifier 34 (i.e., indicating an insurance endorsement). In other implementations a checkbox field could be used, such as to be checked only when the data input 24 in the second data entry field 30 is an insurance form identifier 32, or the like.

In the shown data entry window 20, by non-limiting example, there are a plurality of columns for the various data entry fields 22, so that there is one column having a column header (titled "CARRIER") and, below it, a plurality of rows of first data entry fields 26, and so on with the second data entry fields 30, third data entry fields 38, fourth data entry fields 42, fifth data entry fields 46 and sixth data entry fields 114, each under a header with an appropriate name. Other implementations could have other configurations. In implementations one or more or all of the data entry fields 22 are configured to receive a typed entry, such as an alphanumeric (or any ASCII character) entry. In other implementations one or more or all of the data entry fields 22 could be configured to provide a number of entries that a user may select, such as through a dropdown list 66 or the like. In particular implementations the data entry fields 22 could use predictive search such that, as a user begins typing a data input 24 into one of the data entry fields 22, a dropdown list 66 or the like displays one or more selectable options that begin with the characters already typed in, and in implementations these may be arranged in any order such as by popularity, or most recently used, and the like. Other implementations could use other selection mechanisms such as checkbox fields and the like. In the data entry window 20 an edit button 102 is present on each row to allow editing of one or more of the data entry fields 22 in that row, a delete button 104 is present to allow deletion of the entire row, and an add button 106 is present to add a new row.

In the example shown in FIG. 2 it may be seen that a user has added a number of rows for an insurance carrier that has been given "XCEL Ins Group" as an insurance carrier identifier 28 and a number of rows for an insurance carrier that has been given "Ace Insurance" as an insurance carrier identifier 28. For each of these two insurance carriers, a number of insurance form identifiers 32 and insurance endorsement identifiers 34 have been entered.

For example, referring to the fifth row of FIG. 2, it can be seen that, for the insurance carrier "Ace Insurance," an insurance form identifier 32 "CB 00 00 01" has been input which addresses the coverage issue 40 "Mold" and a status 44 of "False" has been inserted (indicating, for instance, that mold is not a covered item or is otherwise excluded in the "CB 00 00 01" insurance form for Ace Insurance). A status score 48 of "0" has been assigned to the status 44, and the form type indicator 116 of "Base" has been inserted/selected, indicating that form "CB 00 00 01" is an insurance form as opposed to an insurance endorsement. Referring now to the fourteenth row on FIG. 2 it can be seen that, for Ace Insurance, an insurance endorsement identifier 34 "CB 00 00 02" has been input which also addresses the coverage issue 40 "Mold" and a status 44 of "Covered" has been inserted (indicating, for instance, that mold is a covered item in the "CB 00 00 02" insurance endorsement for Ace Insurance) and a status score 48 of "4" has been assigned to the status 44, and the form type indicator 116 of "Endors." has been inserted/selected, indicating that form "CB 00 00 02" is an insurance endorsement as opposed to an insurance form. Although the status scores 48 in the representative example impliedly are numbered so that zero is a worse score (i.e., indicating that the coverage issue 40 is not covered, or is not covered as well) and five is a better score (i.e., indicating that the coverage issue 40 is covered, or is covered well), in other implementations this could be reversed such that zero is indicative of a coverage issue 40 that is covered, or is covered well, and five (or some other number) is indicative of the coverage issue 40 not being covered, or not being covered well. Also, in the representative example the status scores 48 range from zero to five. In other implementations the status scores 48 could range, by non-limiting examples, between any ranges from zero (or one) to anywhere from one to one hundred, and the like.

Figure 7:
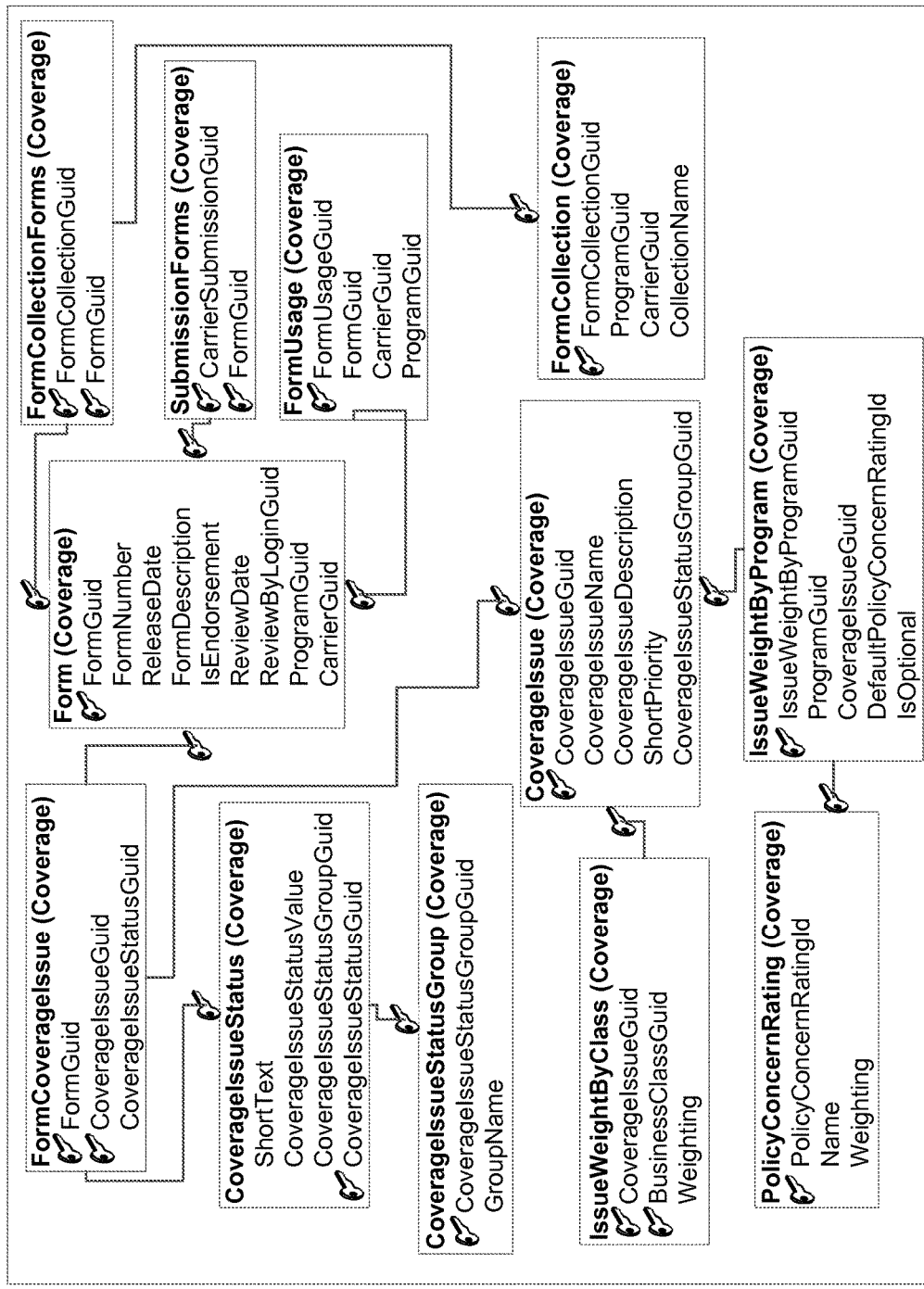
FIG. 7 is a view of an implementation of a database table relationship window of an insurance quote system.

The insurance broker computer 8 is configured in implementations to, in response to receiving the data inputs 24 indicated on the first computer interface 16, communicate with the database server 4 to store the data inputs 24 in a relational database (database 10) using the database server 4. Referring to FIG. 7, in implementations the computer display 18 may include a fourth computer interface 108 which includes a database table relationship window 110 indicating to the user how the various data inputs 24 are stored in tables in the relational database 10 and how the tables are linked together. In implementations the database table relationship window 110 may allow the user to modify the table and/or modify the relationships/links between the tables. The database 10 and database server 4 may be implemented using any hardware and/or software components. By non-limiting example, in implementations the database 10 and/or database server 4 may include one or more database software formats marketed under the tradenames: ORACLE by Oracle Corporation of Redwood Shores, Calif.; IBM DB2 by International Business Machines Corporation (IBM) of Armonk, N.Y.; MYSQL by Oracle Corporation; INFORMIX by IBM; MICROSOFT SQL SERVER by Microsoft Corporation; MICROSOFT ACCESS by Microsoft Corporation; INGRES by Actian Corporation of Redwood City, Calif.; and the like. In the implementations shown the database 10 and database server 4 include a MICROSOFT SQL SERVER database.

Referring back to FIG. 2, a user (such as an insurance broker) may, using the data entry window 20, populate the database 10 with data inputs 24, by storing the data inputs 24 in the database 10, so that they may later be queried from the database 10 to create a quote report (insurance quote report) 62, as will be described hereafter. The user may, for instance, insert data inputs 24 related to a number of insurance forms and insurance endorsements for each insurance carrier that the user has (or may have) dealings with. For example, an insurance broker that has dealings with a number of automobile insurance carriers could, for each insurance carrier that it has dealings with, insert a row for each coverage issue 40 for each insurance form and each coverage issue 40 for each insurance endorsement that the insurance broker is likely to deal with in its dealings with the automobile insurance carrier. Insurance brokers that have dealings with insurance carriers for more than one specific insurance product (for example an insurance broker that has dealings with insurance carriers that offer environmental liability insurance, and flood insurance, and professional liability insurance, and the like) may simply insert more rows, one for each coverage issue 40 for each insurance form or insurance endorsement from each insurance carrier that it has dealings with. By non-limiting example, the insurance broker could insert a row for each coverage issue 40 for each insurance form and/or for each insurance endorsement for each insurance carrier it has (or may have) dealings with. When or if an insurance carrier provides a new insurance form or a new insurance endorsement, or makes a modification thereto, or replaces one insurance form or insurance endorsement with another, or ceases using an insurance form or insurance endorsement, the insurance broker could return to the data entry window 20 to modify existing entries, delete entries or add new entries, accordingly, so that the data inputs 24 stored in the database 10 are up to date.

In implementations the insurance carrier identifiers 28 are user-chosen identifiers and could include a commonly-used name of an insurance carrier or could be some other identifier that the user chooses. For example, an insurance broker could use an alphanumeric value, or just a numerical value, or any other identifier to identify the insurance carrier, and could insert this for the insurance carrier identifier 28. The same goes for the insurance form identifiers 32 and the insurance endorsement identifiers 34, though in implementations it would naturally be useful to have the insurance form identifiers 32 and insurance endorsement identifiers 34 match with identifiers that are used by the insurance carrier itself so that, for example, when an insurance quote 118 is provided to the insurance broker that indicates a number of insurance forms and/or insurance endorsements, the insurance broker could more easily select the insurance form identifiers 32 and insurance endorsement identifiers 34 by selecting the ones that have the same values or names or other identifiers as those displayed on the insurance quote 118.

The coverage issues 40 are likewise identifiers or names chosen by the user. In implementations, for instance, an insurance broker may choose to identify or name a coverage issue 40 with a name or identifier that is given in an insurance form or insurance endorsement. For example, an insurance form related to environmental liability insurance may have a section titled "Mold" that details how mold is dealt with in an insurance policy, and the insurance broker may decide to create a coverage issue 40 titled "Mold" using the data entry window 20. In implementations the insurance broker could decide to not create this coverage issue 40 for "Mold," for instance if the insurance broker determines that it is not an item of interest to include in the later quote report 62. For example, if all environmental insurance carriers tend to treat mold similarly, such as by broadly covering it, or refusing to cover it at all, in substantially the same manner, the insurance broker may determine to not create a coverage issue 40 for "Mold" since including it in the quote report 62 may not serve a distinguishing function to distinguish the potential buyer as to how one quote 118 compares with another—the insurance broker in that instance may instead determine to create coverage issues 40 for other issues that serve to distinguish between the insurance carriers, where they differ—such as how they deal with asbestos, or silica, or transit pollution, and the like.

In various implementations, a user could group several items from an insurance form or an insurance endorsement together for a single coverage issue 40—for example an auto insurance form may deal with "bodily injury per person" and "bodily injury per accident" defining payable limits for an injury per person and per accident. In implementations the insurance broker could determine to create a coverage issue 40 "Bodily injury per person" and, additionally, a coverage issue 40 "Bodily injury per accident." In other implementations, the user could create just one coverage issue 40 "Bodily injury" that covers both of these scenarios. In other implementations the user may determine to not include a coverage issue 40 related to bodily injury. In short, there is great flexibility in how a user defines the coverage issues 40.

Each status 44 is defined by the user, as well. In the implementation shown there are several statuses 44 including, by non-limiting example: "Covered," "Not Covered," "Yes," "No," "True," "False," "Excluded," and "Silent." In implementations a user could create more, or less, statuses 44. For example, in implementations a user could decide to just use two statuses 44, such as "Covered" and "Not Covered." In some implementations of an insurance quote system 2 the statuses 44 could be excluded entirely, and status scores 48 alone could be used. With any of the data entry fields 22, in implementations a user could pre-define a list of acceptable values for insertion into the data entry field 22 so that the user is able later to select from among the acceptable values to populate each specific data entry field 22. For example a user could define the above seven values as the only acceptable values (hardcoded) to be inserted into the fourth data entry field 42.

The value inserted into the fifth data entry field 46 for the status score 48 is a value chosen by the user. In implementations of the system, the process of defining the coverage issues 40, statuses 44 and status scores 48 involves a certain amount of subjective analysis based on the experience and preferences of the particular user. For example, for each insurance form and for each insurance endorsement, the user may review and analyze the insurance form or endorsement and, in doing so, determine which coverage issues 40 should be created and decide, based on the user's subjective and experience in analyzing the language of each insurance form or insurance endorsement, which status 44 to use (such as "Covered," "Not Covered," and the like) and, using the user's subjective and experience, determine what status score 48 to assign to the status 44.

By non-limiting example, assuming a "best" status score 48 of five and a "worst" status score 48 of zero, the user may review two insurance forms, from two different insurance carriers, that both offer coverage for the same coverage issue 40 (such as mold), but one may offer somewhat less coverage, and the other may offer somewhat more coverage, so that the status 44 for the "Mold" coverage issue 40 for one insurance form may be "Covered" and may be assigned a status score 48 of, for instance, "2," while the status 44 for the "Mold" coverage issue 40 for the other insurance form may be "Covered" and may be assigned a status score 48 of "4." If another insurance form, for another insurance carrier, does not offer any coverage for mold, the status 44 for the "Mold" coverage issue 40 for that insurance form may be "Not covered" and may be assigned a status score 48 of "0." If another insurance form, for another carrier, offers very good coverage for mold, the status 44 for the "Mold" coverage issue 40 for that insurance form may be "Covered" and may be assigned a status score 48 of "5," and the like.

Finally, each insurance carrier typically has a number of standard insurance forms and a number of standard insurance endorsements that it has been authorized to use by its internal management. For example, an auto insurance carrier may have an insurance form that is a base form for business auto insurance, and a number of insurance endorsements that may or may not be applicable depending on the domicile of the insured, the amount of coverage desired by the insured, and the like. Thus, each insurance policy typically will contain at least one insurance form and one or more insurance endorsements. As described above in the definitions given for "Insurance form" and "Insurance endorsement," an insurance endorsement typically modifies some aspect of an insurance form. In general, insurance forms do not modify insurance endorsements, and insurance endorsements do not modify other insurance endorsements. Accordingly, allowing the user to select the form type with the form type indicator 116 allows the insurance quote system 2 to use this hierarchy in performing calculations—such that if, in an insurance quote 118, an insurance form is provided which includes a coverage issue 40, and an insurance endorsement is provided which also includes the same coverage issue 40, in creating a quote report 62 the insurance quote system 2 may be configured to calculate a final status score 50 by beginning with the status score 48 of the insurance form and doing one or more of adding, subtracting, replacing, averaging, deprecating, or enhancing the status score 48 of the insurance form with a status score 48 for the same coverage issue 40 that is included in an insurance endorsement.

Referring now to FIG. 3, in implementations the computer display 18 further includes a second computer interface 52 having a quote viewing window 54. Referring to FIG. 1, in implementations of an insurance quote system 2 the insurance broker computer 8 and/or the web server 6 receives an insurance application for a specific insurance product, through the telecommunication channel 14, from a computer associated with an insured (or potential insured) or from an insurance agent. By non-limiting example, in implementations the insurance application could come from an insurance agent computer 100. In implementations the insurance broker then, using the insurance broker computer 8 and/or the web server 6, places the insurance application (or its own version of the insurance application) on a website hosted by the web server 6. In implementations the one or more insurance carrier computers 12 may have access to the website through the telecommunication channel 14. In implementations the website may include an online insurance marketplace that allows each insurance carrier to create a profile and to indicate which types of specific insurance products it would be interested in providing and what its appetite for each product is.

In various implementations, the online marketplace may be configured such that, when an insurance application is placed on the online marketplace by sending it to the web server 6 using the insurance broker computer 8, the insurance broker may, additionally, send an indication of the specific insurance product that is desired, and/or any other information related to the insurance application, so that when the insurance application is sent to the web server 6 and placed on the online marketplace, the web server 6 automatically determines which insurance carriers have profiles indicating interest in providing the specific type of insurance product requested in the insurance application, or some other information matching between the insurance carriers and the insurance application, so that the web server 6 sends an automated notification to each insurance carrier computer 12 for which a match is determined. In particular implementations, each insurance carrier may then request, if desired, additional information about the applicant (potential insured) and the web server 6 may be configured to, once receiving this request, notify the insurance broker using the insurance broker computer 8 of the request. The insurance broker may then supply the additional information to the insurance carrier computer 12 through the telecommunication channel 14 and/or through the web server 6.

Each insurance carrier may provide an indication of interest in the insurance application and send this indication from the insurance carrier computer 12 to the web server 6 through the telecommunication channel 14. In implementations the web server 6 may then automatically request all insurance carriers who provided an indication of interest to provide an insurance quote (quote) 118. In other implementations the web server 6 may notify the insurance broker computer 8 when the indications of interest have been received and the insurance broker, using the insurance broker computer 8, may select a subset of the insurance carriers that have provided an indication of interest and send a request, through the web server 6 and through the telecommunication channel 14 to the insurance carrier computers 12, for the selected insurance carriers to provide an insurance quote 118. Each insurance carrier providing a quote 118 may then send the quote 118 to the web server 6 through the telecommunication channel 14. The web server 6 may then send a notification to the insurance broker computer 8 that one or more of the quotes 118 have been received by the web server 6, and the insurance broker may then view each quote 118 using the quote viewing window 54 of the second computer interface 52, as shown in FIG. 3. In implementations the quotes 118 may also be downloaded to the insurance broker computer 8.

As shown in FIG. 3, each quote 118 may include identifying information related to the insurance carrier, identifying or other information related to the person, entity or item to be insured, and various coverage issues 40. Each quote 118 generally will further include a listing of the insurance forms and insurance endorsements included in the quote 118, as representatively illustrated in the hypothetical quote 118 of FIG. 3 by the insurance form identifiers 32 and insurance endorsement identifiers 34 that are shown. Some quotes 118 may also include the actual insurance forms and insurance endorsements that are included in the quote 118, as shown at the bottom of FIG. 3 in which the insurance form "FORM AG 452 221 00" is included (though only the beginning of this form is shown) and, thereafter, the insurance endorsements could be included as well).

The quote 118 may be in any type of electronic document format such as, by non-limiting example, in a document of any of the following types: a .doc, .pdf, .docx, .xml, .dot, .dotx, .htm, .html, .mobi, .odm, .odt, .ott, .pdax, .pda, .rtf, .txt, .wps, .wpt, .wrd, .xhtml, .xps, and the like. Accordingly, the quote viewing window 54 of the second computer interface 52 may include any viewer or other program configured to display one of the above document file types, or any other document file type. In implementations the quote 118 could be included in an electronic data interchange (EDI) document and the quote viewing window 54 of the second computer interface 52 could be a viewer or other computer application configured to display all or a subset of the information contained in the EDI document in a format that is useful for viewing by the user.

Referring to FIG. 4, in implementations the computer display 18 includes a third computer interface 56 having a form selection window 58. The form selection window 58 in implementations allows a user to select the insurance forms and insurance endorsements that are received from insurance carriers in quotes 118 in order to prepare a quote report 62. The form selection window 58 may be populated by the data inputs 24 stored in the database 10. By non-limiting example, in the implementation shown in FIG. 4 a plurality of insurance carrier identifiers 28 are listed and, underneath each insurance carrier identifier 28, all of the possible insurance form identifiers 32 and insurance endorsement identifiers 34 for that insurance carrier. An insurance broker may, for instance, after receiving all of the quotes 118 for an insurance application, use the form selection window 58 to indicate, by selecting the appropriate insurance form identifiers 32 and insurance endorsement identifiers 34, all of the insurance forms and insurance endorsements that are included in the quotes 118.

In the implementation shown there is one single window/list that contains all of the insurance form identifiers 32 and insurance endorsement identifiers 34 for each carrier and a checkbox is used to indicate which of these are selected identifiers 36. In other implementations any other type of selection mechanism could be used, such as a drag-and-drop mechanism, a click mechanism by which each insurance form identifier 32 and insurance endorsement identifier 34 may be clicked on to select it, and the like. In implementations a different window/list could be used for each insurance carrier. In implementations a different window may be opened depending on a selection of the specific insurance product. For example, in implementations a specific insurance product selection window could allow a user to select from among a plurality of available specific insurance products and, when a user selects a specific insurance product corresponding with the insurance application and quotes 118, the form selection window 58 could populate a list of insurance form identifiers 32 and insurance endorsement identifiers 34 grouped according to insurance carrier identifiers 28 for only those insurance carriers (and insurance forms and insurance endorsements) that are applicable to the specific insurance product. To facilitate this functionality, the data entry window 20 could be configured to have a data entry field 22 configured to receive an identifier related to each insurance form and insurance endorsement indicating a user-defined specific insurance product type.

In implementations a report generation button 60 is included in the form selection window 58. In other implementations the report generation button 60 could be included in a separate window. When the report generation button 60 is selected by a user, the insurance broker computer 8 communicates with the database server 4 to generate an insurance quote report 62 and populate fields within the insurance quote report 62 with data inputs 24 retrieved from the database 10 and/or with values calculated by the database server 4 and/or the insurance broker computer 8. The insurance quote report 62 may be of any electronic document format type, including any of those listed above. In the implementation shown the insurance quote report 62 is an MS Word document (by Microsoft Corporation) that uses software code (such as code marketed under the tradename VISUAL BASIC by Microsoft Corporation) to populate fields using data inputs 24 that are retrieved from the database 10. Accordingly, when a user selects the report generation button 60, the insurance broker computer 8 requests the database server 4 to query the database 10 for data inputs 24 associated, through the tables of the relational database 10, with the selected identifiers 36, and these data inputs 24 are then populated into fields in the quote report 62.

In the page of the quote report 62 shown in FIG. 5 there are a plurality of coverage issues 40 and, in a table 64 for each coverage issue 40, one or more insurance carrier identifiers 28 and, for each insurance carrier identifier 28, the final status score 50 of that insurance carrier for that coverage issue 40. In various implementations, summaries or other informational sections describing each coverage issue could be included (such as are included directly below the coverage issues 40 in the quote report 62 shown in FIG. 5). In particular implementations, all of these elements, including the coverage issue 40, the summaries or other informational sections, the tables 64, insurance carrier identifiers 28 and final status scores 50 could be stored in relational tables in the database 10 and could be populated into the quote report 62 by the database server 4 querying the database 10 and then placing appropriate values into fields in the quote report 62. In implementations only some of the items in the quote report 62 are populated from the database 10 (such as only the tables 64, insurance carrier identifiers 28 and final status scores 50, and other elements may be included in the document template before the fields are populated.

Referring to FIG. 6, in various implementations the quote report 62 may include one or more summary pages. The one or more summary pages in particular implementations may include one or more tables 112 that include information such as, by non-limiting example: the number of insurance carriers who reviewed a portion of the insurance application (basic information), the number of insurance carriers who reviewed the insurance application (all information), the number of carriers who offered a quote 118, the number of insurance carriers who indicated a previous quote 118, the number of carriers who provided an indication of interest, the number of carriers who requested additional information about the applicant (potential insured), the insurance carrier identifiers 28 of the insurance carriers who provided any of the above, the common names of the insurance carriers who provided any of the above, the proposed effective date for each quote 118, the proposed expiration date for each quote 118, the proposed policy term for each quote 118, the proposed limits, deductibles, and premiums for each quote 118, additional explanations, information and the like, and any other item helpful to the potential buyer to be included in the quote report 62. Any and all of this information could have been stored in the database 10 prior to the report generation by the user, such as through the use of other windows and computer interfaces of the insurance broker computer 8, and then retrieved from the database to be included in the one or more summary pages of the quote report 62.

In implementations the quote report 62 further includes a table 120 that includes the insurance carrier identifier 28 for each insurance carrier that provided a quote 118 and an overall score 68 for each quote 118. The overall score 68 for each quote 118, in implementations, may be a numeric value from zero to five and may be calculated in any manner from the status scores 48 and/or the final status scores 50 (for instance it could be an average or median of all the final status scores 50 for that quote 118). In other implementations the overall score 68 could simply be a ranking (for instance 1st, 2nd, 3rd, and the like, simply ordering the quotes 118 from most desirable or most recommended to least desirable or least recommended), but in this case the ranking may still be calculated by the database server 4 and/or the insurance broker computer 8 using the status scores 48 and/or the final status scores 50. In implementations the quote report 62 could also include, in the tables 64, the status 44 for each coverage issue 40 for each quote 118, as indicated by the uppermost table 64.

In implementations the calculation of a final status score 50 for each status 44 for each coverage issue 40 for each quote 118 may be calculated by taking the status score 48 associated, through the database 10, with the coverage issue 40 for an insurance form of the quote 118 and adding, subtracting, modifying, deleting, replacing, deprecating, or enhancing it (or to it) with the status score 48 associated, through the database 10, with the same coverage issue 40 for an insurance endorsement of the same quote 118. By non-limiting example, in particular implementations the status score 48 associated with the coverage issue 40 for the insurance form could have a value of zero (for instance the coverage issue 40 is excluded from coverage), but the status score 48 associated with the coverage issue 40 for the insurance endorsement may be a five (for instance the insurance endorsement indicates that very good coverage is provided for the coverage issue 40). In such a case, the zero value may be replaced with the five value to create a final status score 50 with a value of five. In other implementations the two values could be added (for instance the insurance form provides some coverage, and the insurance endorsement provides additional coverage), subtracted (for instance the insurance form provides some coverage, but the insurance endorsement adds limitations to that coverage), averaged, and the like.

In implementations the insurance quote system 2 may be configured to prepare and send feedback, from the web server 6 to the insurance carrier computers 12 associated with the insurance carriers that provided quotes 118 for a specific insurance product, including such information as: what other insurance carriers provided quotes 118; which insurance carrier had the winning quote 118; a summary of how other quotes 118 compared with one another in terms of coverage for various items, term, deductibles, premiums, and the like. In this way, insurance carriers may be able to determine when/if they are not being competitive enough so that they may be able to adjust their future quotes 118 accordingly.

In this aspect, the system permits the system to function similarly to an auction or bidding system where carriers have the opportunity to bid on applications from potential buyers and get immediate feedback on what the winning bids were. Because of the feedback to the carriers and the use of the quote report 62 by the potential buyers, the transparency of the process for the potential buyers may be improved, as the key issues for each product are able to be compared side by side along with the costs of obtaining the quoted coverage. Because the buyer makes a more informed decision and does not rely so heavily on the relationship with the insurance agent and/or broker, buyers may purchase more intelligently and discriminatingly, which provides incentives to the carriers to improve their offerings and make them more competitive in those areas that the potential buyers are using to make distinctions as to how to purchase.

Figure 8:
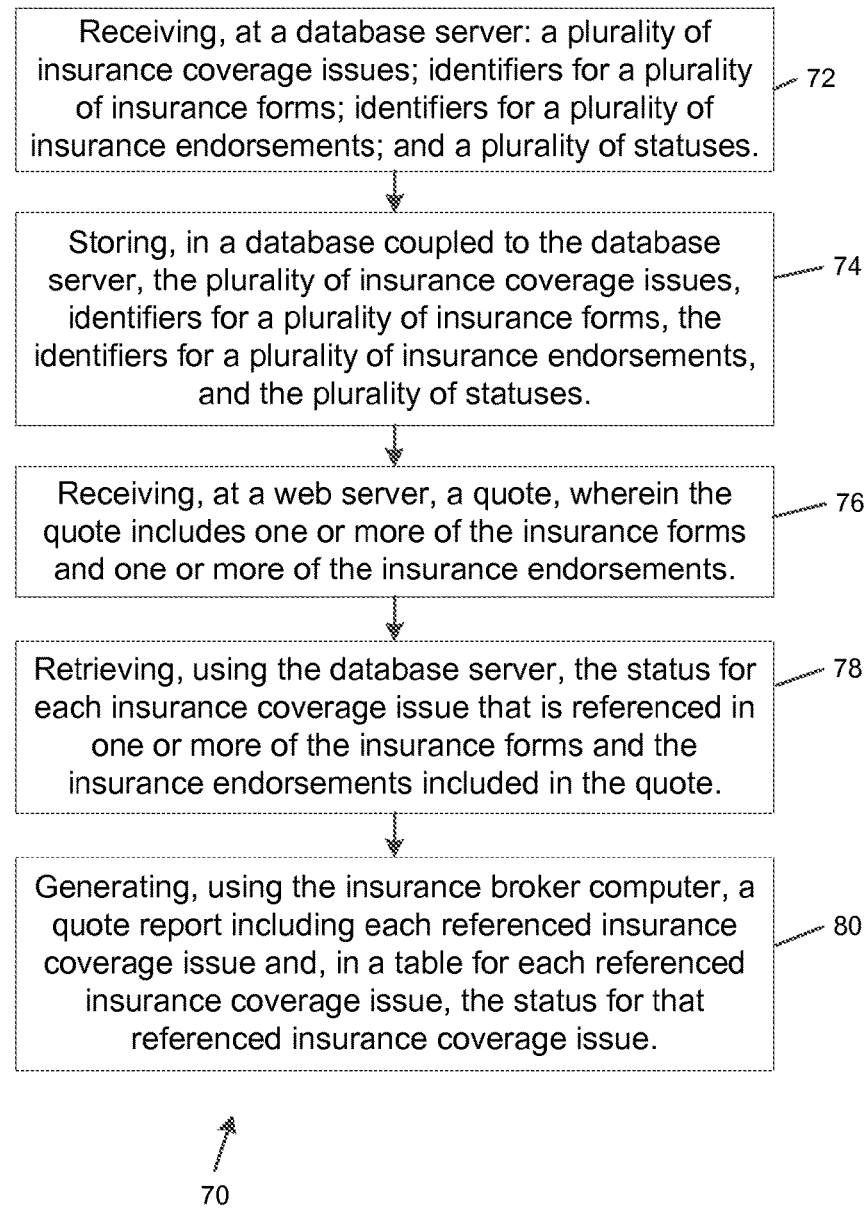
FIG. 8 is a flowchart of an implementation of a method of providing a quote report using an insurance quote system.

Referring to FIG. 8, in implementations a method 70 of providing an insurance quote report 62 may include receiving, at a database server 4 from an insurance broker computer 8 coupled to the database server 4: a plurality of insurance coverage issues 40; a plurality of insurance form identifiers 32, where each insurance form references at least one of the insurance coverage issues 40; identifiers for a plurality of insurance endorsements (insurance endorsement identifiers) 34, wherein each insurance endorsement references at least one of the insurance coverage issues 40; and a plurality of statuses 44, wherein each status 44 represents a way in which one of the insurance coverage issues 40 is addressed in one or more of the insurance forms and the insurance endorsements (i.e., whether it is covered or not, or excluded, or whether the insurance form or insurance endorsement is silent on the matter), and wherein each status 44 includes one of a numerical value from zero to five, "yes," "no," "covered," "not covered," "excluded," "true," "false" and "silent" (step 72); The method 70 also includes storing, in a database 10 coupled to the database server 4, using the database server 4, the plurality of insurance coverage issues 40, the insurance form identifiers 32, the insurance endorsement identifiers 34, and the plurality of statuses 44 (step 74) and receiving, at a web server 6 coupled to the database server 4, through a telecommunication channel 14, from an insurance carrier computer 12, a quote 118, wherein the quote 118 includes one or more of the insurance forms and one or more of the insurance endorsements (step 76). The method 70 also includes retrieving, using the database server 4, the status 44 for each insurance coverage issue 40 that is referenced in one or more of the insurance forms and the insurance endorsements included in the quote 118 (referenced insurance coverage issues 40, step 78). The method 70 additionally includes generating, using the insurance broker computer 8, the quote report 62, the quote report 62 including each referenced insurance coverage issue 40 and, in a table 64 for each referenced insurance coverage issue 40, the status 44 for that referenced insurance coverage issue 40 (step 80).

In various implementations, the method may further include receiving at the database server 4, from the insurance broker computer 8, a status score 48. The method 70 may also include receiving, at the web server 6, through the telecommunication channel 14, from the insurance carrier computer 12, one of an updated insurance form and an updated insurance endorsement. For example, an insurance carrier may indicate that it has modified one of its forms. In response, the insurance broker may update the related information in the insurance quote system 2. Accordingly, the method 70 may include receiving at the database server 4, from the insurance broker computer 8, an updated status 44. The method could also include receiving at the database server 4, from the insurance broker computer 8, an updated insurance carrier identifier 28, an updated insurance form identifier, an updated insurance endorsement identifier, an updated status 44, and the like. In various implementations each referenced insurance coverage issue 40 included in the quote report 62, and the status 44 for that referenced insurance coverage issue 40, is retrieved from the database 10.

Figure 9:
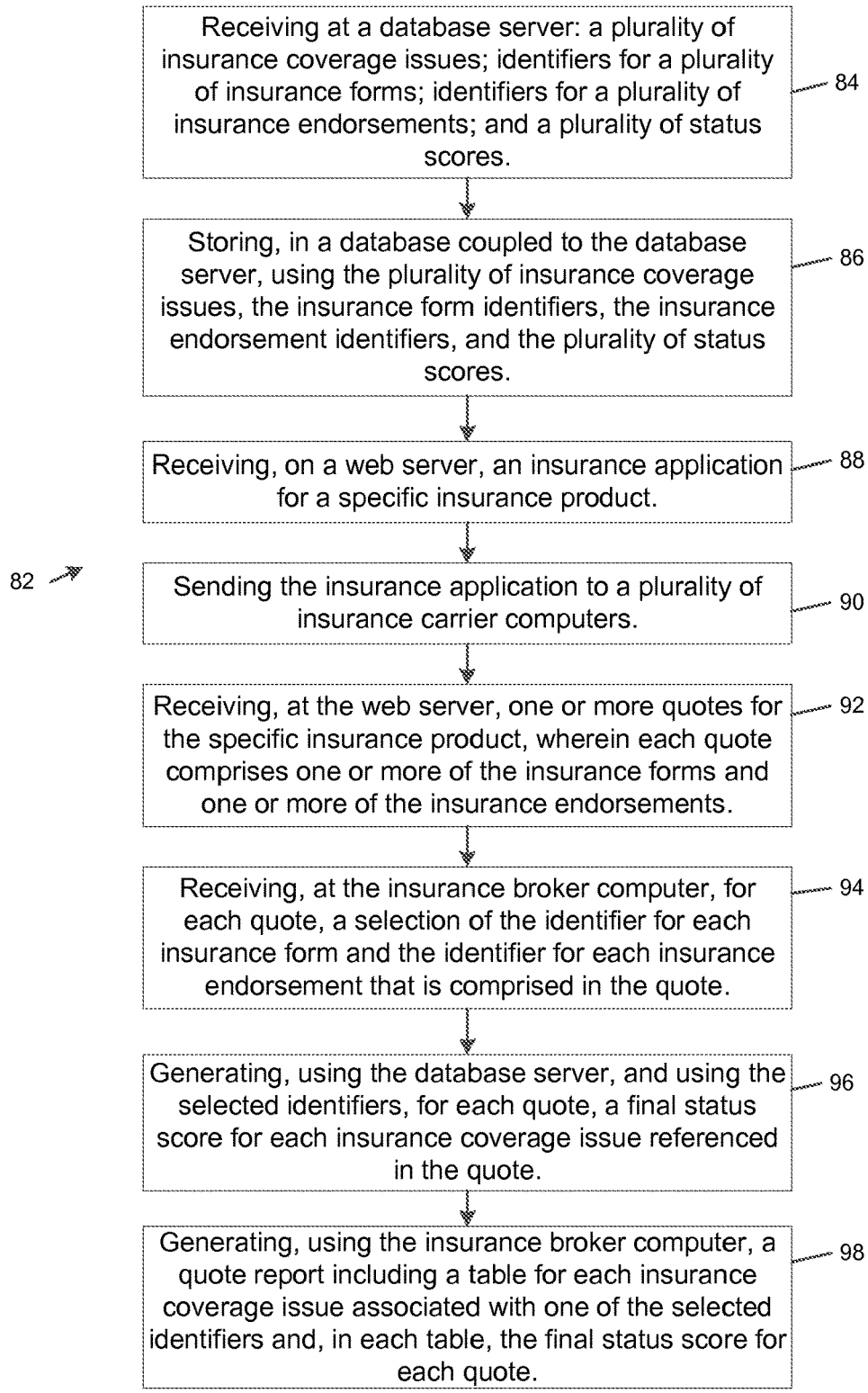
FIG. 9 is a flowchart of another implementation of a method of providing a quote report using an insurance quote system.

Referring now to FIG. 9, implementations of a method 82 of providing an insurance quote report (quote report) 62 include receiving at a database server 4, from an insurance broker computer 8 coupled to the database server 4: a plurality of insurance coverage issues 40; a plurality of insurance form identifiers 32, wherein each insurance form references at least one of the insurance coverage issues 40; identifiers for a plurality of insurance endorsements (insurance endorsement identifiers) 34, wherein each insurance endorsement references at least one of the insurance coverage issues 40; and a plurality of status scores 48, each status score 48 associated with one of the insurance coverage issues 40 that is referenced in one or more of the insurance forms and the insurance endorsements (step 84). The method 82 may also include storing, in a database 10 coupled to the database server 4, using the database server 4, the plurality of insurance coverage issues 40, the insurance form identifiers 32, the insurance endorsement identifiers 34, the plurality of status scores 48 (step 86). The method includes receiving, on a web server 6 coupled to the database server 4, from the insurance broker computer 8, an insurance application for a specific insurance product (step 88) and sending the insurance application, using the web server 6, through a telecommunication channel 14, to a plurality of insurance carrier computers 12 (step 90). The method 82 may also include receiving, at the web server 6, through the telecommunication channel 14, from one or more of the insurance carrier computers 12, one or more quotes 118 for the specific insurance product, wherein each quote 118 includes one or more of the insurance forms and one or more of the insurance endorsements (step 92) and receiving, at the insurance broker computer 8, for each quote 118, a selection of the identifier for each insurance form 32 and the identifier for each insurance endorsement 34 that is included in the quote 118 (selected identifiers 36, step 94). The method 82 may also include generating, using the database server 4, and using the selected identifiers 36, for each quote 118, a final status score 50 for each insurance coverage issue 40 referenced in the quote 118 (step 96) generating, using the insurance broker computer 8, the quote report 62, the quote report 62 including a table 64 for each insurance coverage issue 40 associated, through the database 10, with one of the selected identifiers 36 and, in each table 64, the final status score 50 for each quote 118 (step 98).

In various implementations, calculating the final status score 50 includes using each status score 48 that is associated, through the database 10, with the insurance coverage issue 40 and that is associated, through the database 10, with at least one of the selected identifiers 36 for the quote 118. In other implementations, calculating the final status score 50 includes one of adding, subtracting, replacing, deprecating, and enhancing a status score 48 for the insurance coverage issue 40 that is associated, through the database 10, with one of the selected insurance form identifiers 32, in view of a status score 48 for the insurance coverage issue 40 that is associated, through the database 10, with one of the selected insurance endorsement identifiers 34. In implementations the method 82 includes receiving, at the web server 6, through the telecommunication channel 14, from one or more of the insurance carrier computers 12, a request for additional information regarding an applicant. In other implementations, the method 82 includes sending, from the web server 6, through the telecommunication channel 14 to one or more of the insurance carrier computers 12, additional information regarding the applicant. In various implementations, the method 82 includes receiving, at the web server 6, through the telecommunication channel 14, from one or more of the insurance carrier computers 12, an indication of interest. The method 82 may also include receiving, at the web server 6, from one or more of the insurance carrier computers 12, a request to view the insurance application.

Implementations of an insurance quote system 2 may use an ASP.NET framework web interface, a stand-alone desktop application, and the like. In implementations the quote report 62 may be written to a website using the web server 6, such as by generating a link for access through a computer associated with a potential insured, or through the insurance agent computer 100, or the like. In implementations actual insurance forms and insurance endorsements for insurance carriers may be stored in the database 10 as well, and may be retrieved or accessed using a form viewing window of a sixth computer interface of the computer display 18. The insurance forms and insurance endorsements may be stored in any of the electronic document formats indicated in this application and the sixth computer interface may, for example, provide a list of links (such as a master list of links in a PDF document, or in an HTML document, or any other type of document listed in this application) to open, in the same window or in a new window, the insurance form(s) and/or insurance endorsement(s) selected.

The insurance quote system 2 enables the preparation of insurance quote reports 62 in a way that would not be possible without the use of an insurance broker computer 8, a database server 4, database 10 and the like to perform the functions described herein. For example, according to the Insurance Information Institute (www.iii.org), in 2012 there were at least 6,115 insurance carriers in the U.S. Each of these insurance carriers has a plurality of insurance forms and a plurality of insurance endorsements for each specific insurance product for which it provides coverage. Many insurance carriers provide coverage for multiple specific insurance products. As an example, Government Employees Insurance Company (GEICO) of Chevy Chase, Md. provides insurance for at least seventeen specific insurance products, including: auto insurance; motorcycle insurance; ATV insurance; umbrella insurance; homeowners insurance; renters insurance; condo/co-op insurance; RV insurance; life insurance; boat/PWC insurance; flood insurance; mobile home insurance; overseas insurance; commercial auto insurance; business insurance; collectibles insurance, and; collector car insurance. For each of these specific insurance products, the insurance carrier will likely have at least one (and likely several) insurance forms and many insurance endorsements. The Insurance Services Office, Inc. (ISO) of Jersey City, N.J. (website available at www.iso.com), which provides standardized forms to insurance carriers, offers, for specific insurance products related to homeowners, 6 insurance forms, 82 countrywide insurance endorsements and 242 state-specific insurance endorsements (thus 324 insurance endorsements, total). For commercial general liability ISO maintains 11 insurance forms, 212 countrywide insurance endorsements and over 400 additional insurance endorsements (thus over 612 insurance endorsements).

As indicated above, many insurance carriers provide coverage for more than one specific insurance product. It is mentioned above that GEICO provides coverage for at least seventeen types of specific insurance products, but as GEICO is a larger insurance carrier, for purposes of a calculation, a conservative estimate is the assumption that each insurance carrier provides, on average, coverage for at least three specific insurance products. Based on the ISO insurance forms and insurance endorsements data, a conservative estimate would be to assume that, for each specific insurance product for which coverage is offered, the insurance carrier maintains 1 insurance form and, for each insurance form, 20 insurance endorsements (this is a very conservative estimate as there are 50 states in the U.S. and there are very often state-specific endorsements). Since the insurance forms (and insurance endorsements) for any specific insurance carrier are somewhat different from those of any other, rounding down to 6,000 insurance carriers in the U.S., creates an estimate of 6000×3×1=18,000 unique insurance forms and 6,000×3×20=360,000 unique insurance endorsements. If we estimate an average page count for each insurance form at about ten pages, and the page count of each endorsement at about 2 pages, this would add up to about 18,000×10+360,000×2=900,000 pages potentially requiring review for the system to involve all available insurance carriers Having to sift through a specific insurance form and several insurance endorsements manually, each time a quote 118 is received, can thus be incredibly time consuming. Manual generation of a quote report 62 historically took about two and a half weeks to prepare the status scores 48 and the quote report 62 as the issues relevant to the quote had to be created and each form and endorsement in each quote had to be manually reviewed and scored against the list of issues. In contrast, once the status scores 48 are stored in the database 10, an insurance broker would be able to prepare a quote report 62 using the insurance quote system 2 in a matter of seconds or minutes and, if any changes needed to be made to the quote report 62, they could likewise be made quickly and the quote report 62 re-generated in seconds or minutes. For example, if the insurance broker has provided a number of quote reports 62, but then one of the insurance carriers modifies one of its insurance endorsements upon which several of the quote reports 62 were based, the insurance broker could review the modified insurance endorsement, edit one or more data inputs 24 appropriately, and then just regenerate the quote reports 62 and they would automatically be repopulated with the appropriate information and values.

The use of the servers, database, computer interfaces, and implementing methods, then makes possible what is entirely impractical to do by mere human effort alone and establishes a marketplace for insurance buyers and sellers that enables buyers to compare plans by issues identified by experienced insurance professionals and gives carriers feedback on how well their offerings are competing in the marketplace. Such a system does not presently exist, and meets long-felt needs. The immensity of the information that needs to be reviewed quote by quote and updated is handled by use of the system and method implementations disclosed herein.

In places where the description above refers to particular implementations of insurance quote systems and related methods and implementing components, sub-components, methods and sub-methods, it should be readily apparent that a number of modifications may be made without departing from the spirit thereof and that these implementations, implementing components, sub-components, methods and sub-methods may be applied to other insurance quote systems and related methods.

What is claimed is:

1. An insurance quote system, comprising:
   a database server, a web server and an insurance broker computer operatively coupled together, the database server coupled to a database;
   a plurality of insurance carrier computers coupled with the web server through a telecommunication channel;
   a first computer interface displayed on a computer display coupled with the insurance broker computer, the first computer interface comprising a data entry window comprising a plurality of data entry fields configured to receive data inputs, including:
      a first data entry field configured to receive an insurance carrier identifier;
      a second data entry field configured to receive an identifier for one of an insurance form (insurance form identifier) and an insurance endorsement (insurance endorsement identifier);
      a third data entry field configured to receive an insurance coverage issue;
      a fourth data entry field configured to receive a status for the insurance coverage issue; and
      a fifth data entry field configured to receive a status score for the insurance coverage issue;
   wherein the insurance broker computer is configured to, in response to an input from a user, request the database server to write the data inputs to the database, and wherein the database server is configured to write the data inputs to the database in response to the request;
   a second computer interface displayed on the computer display comprising a quote viewing window configured to allow the user to view a plurality of quotes received at the web server through the telecommunication channel from the plurality of insurance carrier computers; and
   a third computer interface displayed on the computer display comprising a form selection window configured to allow the user to select a plurality of insurance form identifiers and insurance endorsement identifiers indicating a plurality of insurance forms and a plurality of insurance endorsements referenced in the plurality of quotes;
      wherein the third computer interface comprises a report generation button configured to generate, upon selection by the user, a quote report, wherein the insurance broker computer is configured to, in response to the report generation button being selected, retrieve from the database, using the database server, a plurality of insurance coverage issues referenced in the plurality of quotes and the status score for each referenced insurance coverage issue and include, in the quote report, in a table for each referenced insurance coverage issue, the status score for that referenced insurance coverage issue.

2. The system of claim 1, wherein the first through fifth data entry fields are further configured to edit an already received data input.

3. The system of claim 1, wherein one or more of the first through fifth data entry fields comprises a dropdown list.

* * * * *